United States Patent [19]
Gentile

[11] Patent Number: 5,836,544
[45] Date of Patent: Nov. 17, 1998

[54] EMERGENCY SOFT-LANDING SYSTEM FOR ROTOR-TYPE AIRCRAFT

[76] Inventor: Dino M. Gentile, 10001 Limerick Ave, Chatsworth, Calif. 91311

[21] Appl. No.: 645,283

[22] Filed: May 13, 1996

[51] Int. Cl.$^6$ .................................................. B64D 25/00
[52] U.S. Cl. ...................... 244/17.17; 244/139; 244/147
[58] Field of Search ................ 246/17.11, 17.17, 246/139, 138 R, 148, 140

[56] References Cited

U.S. PATENT DOCUMENTS

| | | | |
|---|---|---|---|
| 1,345,970 | 7/1920 | Stanley | 244/139 |
| 1,588,713 | 6/1926 | Ellingsworth | 244/147 |
| 1,844,740 | 2/1932 | Bradley | 244/139 |
| 1,909,067 | 5/1933 | Nouslakis | 244/139 |
| 2,729,408 | 1/1956 | Quilter | 244/139 |
| 2,972,458 | 2/1961 | Sepp, Jr. | 244/147 |
| 3,054,584 | 9/1962 | Andras | 244/139 |
| 3,129,909 | 4/1964 | Smith | 244/139 |
| 3,700,192 | 10/1972 | Pleasants et al. | 244/139 |
| 4,108,402 | 8/1978 | Bowen | 244/139 |
| 4,496,122 | 1/1985 | Whipple | 244/139 |
| 5,259,574 | 11/1993 | Carrot | 244/139 |

*Primary Examiner*—Galen L. Barefoot
*Attorney, Agent, or Firm*—Albert O. Cota

[57] ABSTRACT

An emergency soft-landing system (10) for use on a rotor-type aircraft such as a helicopter (70). The system (10) includes at least one parachute-containing structure (12) that houses at least one parachute (50). The structure (12) is designed to be selectivelly attached to various locations on the helicopter's lower surface (76), the sides (82), and to the landing gear struts (85). The parachute (50) is deployed from the structure (12) when an out-of-control landing is unavoidable or an extreme emergency exists. The system (10) can be designed so that the parachute-containing structure (12) operates in combination with an airbag (60). An airbag can be attached to the helicopter's lower surface (76) near the rear end (78), and front end (80), and to the center of the helicopter between the landing gear (84). The parachute(s) (50) and airbag(s) (60) are designed to be manually deployed by a helicopter crew member or automatically by a dynamic responsive switch (34). The switch (34) is enabled when the helicopter reaches a specified altitude or an abnormal rate of descent.

5 Claims, 6 Drawing Sheets

EMERGENCY SOFT-LANDING SYSTEM FOR ROTOR-TYPE AIRCRAFT

TECHNICAL FIELD

The invention pertains to the general field of helicopter safety systems and more particularly to a parachute deployment system that allows a helicopter to descent slowly to the ground in the event of a power failure or other extreme emergency.

BACKGROUND ART

Helicopters and other rotor-type aircraft depend upon the proper performance of overhead rotor blades to remain aloft and/or to hover while in the air. A typical fixed-wing aircraft is unable to hover due to the necessity of requiring an airflow under the wings to maintain the aircraft in an airborne mode.

Unlike many fixed-wing aircraft, helicopters are unable to provide any glide characteristics should the rotor blades cease to function. There are several reasons why these blades can become disabled: the blades can separate, a fracture in whole or in part relative to the rotor blade hub can occur, or the rotor drive motor could experience a malfunction or failure. Consequently, as a result of any of these problems, once the rotor blades become disabled, a helicopter will probably crash, or at least land in a severely dangerous manner.

A further danger to helicopter flight is that, in the normal mode of operation, flight usually occurs at relatively low altitudes. In the event of rotor blade failure, the low altitude would make it impossible for any passenger or crew member to jump from the helicopter with a conventional parachute. The helicopter would be at an altitude though, if a passenger or crew member attempted to jump without a parachute, he or she would suffer serious injury or death. Thus, a need exists for the provision of a safety descent system for helicopters or other types of rotor-type aircraft whereby such aircraft can achieve a relatively soft and safe landing when there is a rotor malfunction or other emergency landing situation occurs.

A search of the prior art did not disclose any patents or related publications that read directly on the claims of the instant invention, however the following U.S. Patents are considered related:

| U.S. Pat. No. | INVENTOR | ISSUED |
| --- | --- | --- |
| 4,709,881 | Rafikian, et al | 1 December 1987 |
| 3,377,037 | Stewart | 9 April 1968 |
| 3,138,348 | Stahmer | 23 June 1964 |
| 2,657,880 | Bannister | 3 November 1953 |

The U.S. Pat. No. 4,709,881 Rafikian et al patent discloses a parachute-type safety lowering or descent system for helicopters or other hovering aircraft. The system includes a rotor hub assembly to which is secured a parachute housing, which contains the safety lowering parachute. The rotor hub assembly is secured by means of a dual set of vertically spaced ball bearings, which rotationally isolate the parachute housing from the induced rotational effects of the hub rotor assembly under normal aircraft operating conditions. In an emergency, however, such as the case of a rotor, rotor blade, rotor hub assembly or rotor drive engine failure, the safety lowering parachute will be deployed. Once deployed, the entire weight load of the aircraft is supported by the safety parachute.

The U.S. Pat. No. 3,377,037 Stewart patent discloses an aircraft emergency parachute ejection system. The system is used on a rotor sustained aircraft and features a passenger cabin that includes the parachute ejection system. The cabin separates and is ejected from the aircraft fuselage prior to the deployment of the parachute.

The U.S. Pat. No. 3,138,348 Stahmer patent discloses a parachute attached to a helicopter in a position from which it can be deployed quickly to slow the descent of the aircraft. The parachute is contained in a housing that is located above the hub of the horizontally rotating helicopter blade.

The U.S. Pat. No. 2,657,880 Bannister patent discloses a parachute-equipped helicopter which provides an arrangement that allows a disabled helicopter rotor and associated components to be released from the body of the helicopter. Thus, the rotor will not interfere or be in the way of a parachute carried by the helicopter below the hub of the rotor.

For background purposes and as indicative of the art to which the invention relates, reference may be made to the following remaining patents found in the search:

| U.S. Pat. No. | INVENTOR | ISSUED |
| --- | --- | --- |
| 5,386,781 | Day | 7 February 1995 |
| 5,362,016 | Aronne | 8 November 1994 |
| 4,948,071 | Summers, III | 14 August 1990 |
| 3,595,501 | Stencel et al | 27 July 1971 |

DISCLOSURE OF THE INVENTION

The emergency soft-landing system disclosed herein is designed to be used with a rotor-type aircraft such as a helicopter. In its most basic design, the system is comprised of:

a) at least one parachute-containing structure having at least one parachute deployment end, b) means for attaching the parachute-attaching structure to a structural member of a helicopter, and c) means for deploying at least one fast-deployment parachute from the parachute deployment end during an emergency landing situation.

The parachute-containing structure is disclosed in two basic designs: in the first design a single structure is used that houses either one or two parachutes. The parachute(s) are deployed from either a front or rear parachute deployment end. In the second design, the parachute-containing structure includes a telescoping section that can consist of either one, two or three sections that extend from either or both ends of the structure. By using a telescoping section, the longitudinal length of the parachute-containing structure can be minimized since the telescoping section can be designed to extend two to three times the length of the structure.

The parachute-containing structure includes a pair of latches that correspond with a corresponding pair of latches located on the fuselage or on the landing gear struts of the helicopter. The parachute-containing structure is designed and dimensioned to be attached to the landing gear struts and to various locations on the helicopter fuselage such as the lower surface, near the front and rear ends, and to the sides of the fuselage. The optimum attachment location is dependent upon the size and configuration of the helicopter.

In addition to the fast-deployment parachute(s), which allow a disabled helicopter to slowly descent to the ground, a set of airbags can also be used in combination with the parachute(s). The airbags, which are mounted in fuselage cavities or in an aerodynamic enclosure, are deployed concurrent with the deployment of the parachute. These airbags provide a cushion to lessen the force of the crash impact.

Both the parachute and airbag can be designed so that they are manually or automatically deployed. In the manual mode, a helicopter crew member activates, by means of a cable assembly, either a spring apparatus or explosive charge, that deploys the parachute. In the automatic mode, a dynamic response switch is employed. This switch automatically activates the spring apparatus or explosive charges when the helicopter has attained a specified altitude or when its rate of descent exceeds a maximum specified level.

In view of the above disclosure it is the primary object of the invention to provide an emergency soft-landing system for helicopters that utilizes a parachute(s) in combination with an airbag(s).

In addition to the primary object of the invention it is also an object to produce a soft-landing system for helicopters that:

utilizes a parachute-containing structure that can be dimensioned and designed to be attached to various locations on the helicopter, utilizes a parachute-containing structure that can be designed to accommodate one or as many as three parachutes, does not interfere with the aerodynamic balance of the helicopter airframe, utilizes parachute-containing structures that are easily attached and detached, are accessible for preventive maintenance and repair; and that is cost effective from both a manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
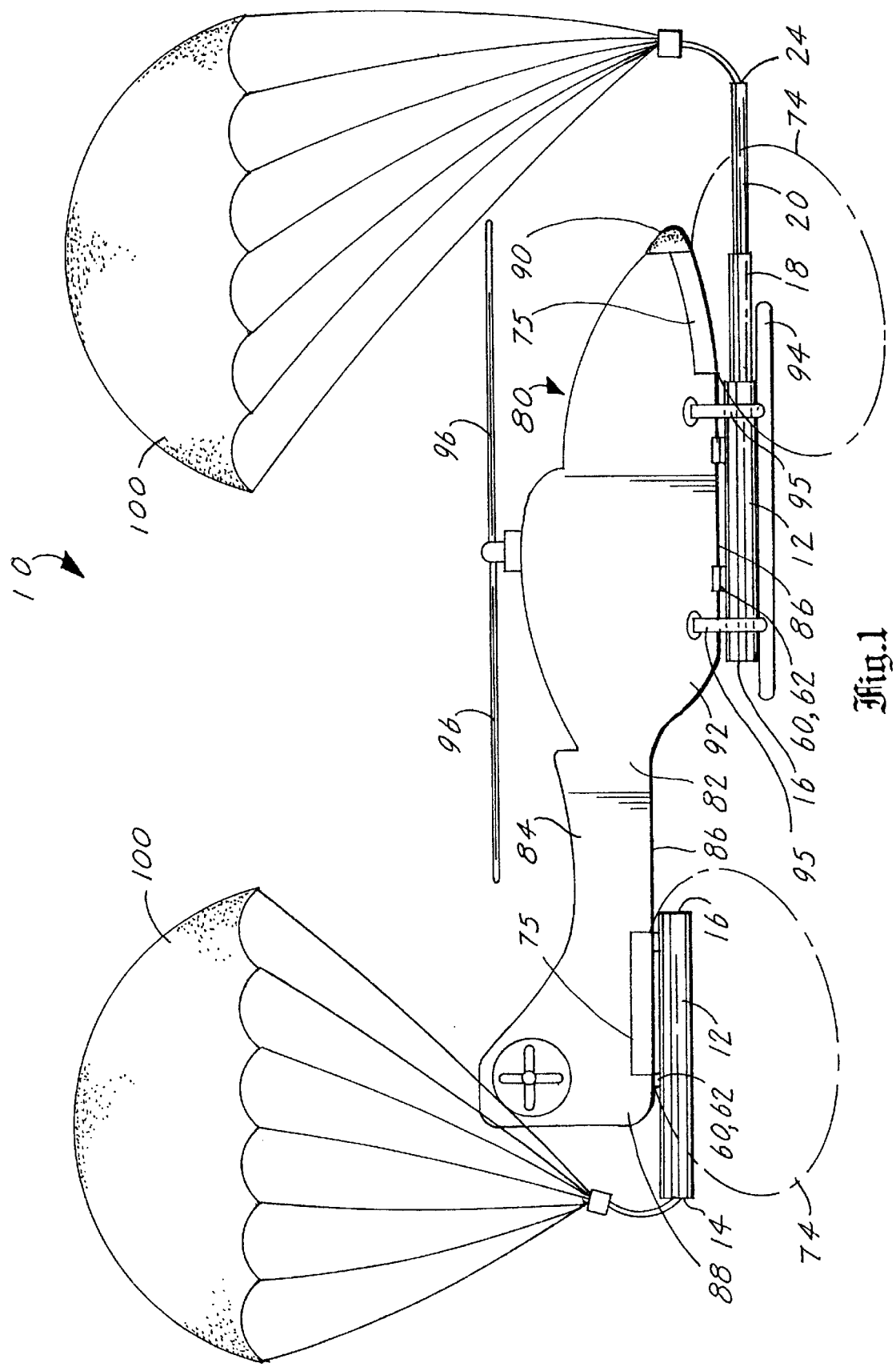
FIG. 1 is an elevational side view of a disabled helicopter that has the emergency soft-landing system deployed which includes the parachutes and the airbags which are shown in phantom.

The best mode for carrying out the emergency soft-landing system 10 is presented in terms of a preferred embodiment, as shown in FIGS. 1–14, that is comprised of three major elements: a parachute-containing structure 12, an airbag 74 and a parachute 100. The three elements are specifically designed for use on a rotor-type aircraft such as a helicopter 80. The emergency soft-landing system 10 is shown in a fully deployed configuration in FIG. 1.

The helicopter 80 includes a fuselage 82 having an upper surface 84, a lower surface 86, a rear end 88, a front end 90, sides 92, a pair of landing gear 94 that extend downward from each side of the fuselage's lower surface 86 and rotor blades 96.

The parachute-containing structure 12 is disclosed in four designs. In all four designs, the structure 12 is configured as an elongated tube that is preferably constructed of a metal such as aluminum, however, a high-impact plastic can also be used.

Figure 2:
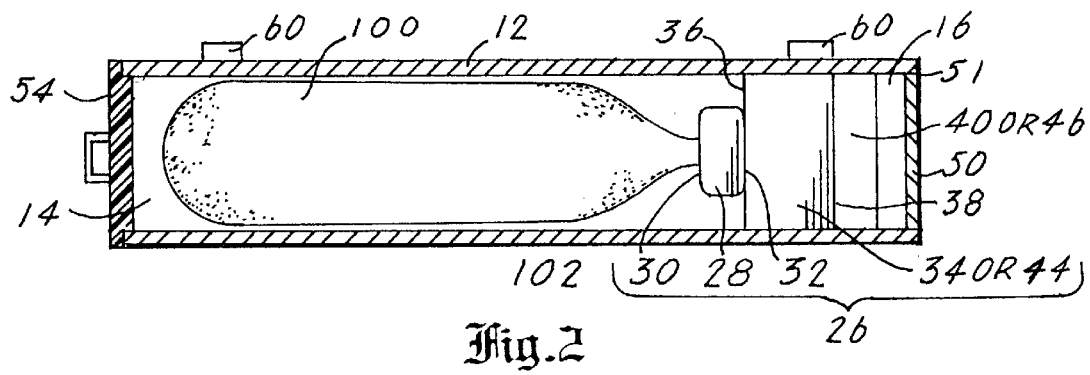
FIG. 2 is a side cross-sectional view of a parachute-containing structure having at least one parachute that is deployed from one end of the structure.

The first design of the parachute-containing structure 12, as shown in FIG. 2, includes a parachute deployment end 14, which can be located at either end, and a corresponding rear end 16. The first design is dimensioned to contain at least one parachute 100 that is deployed from the parachute deployment end 14 by a parachute deployment means 26.

Figure 3:
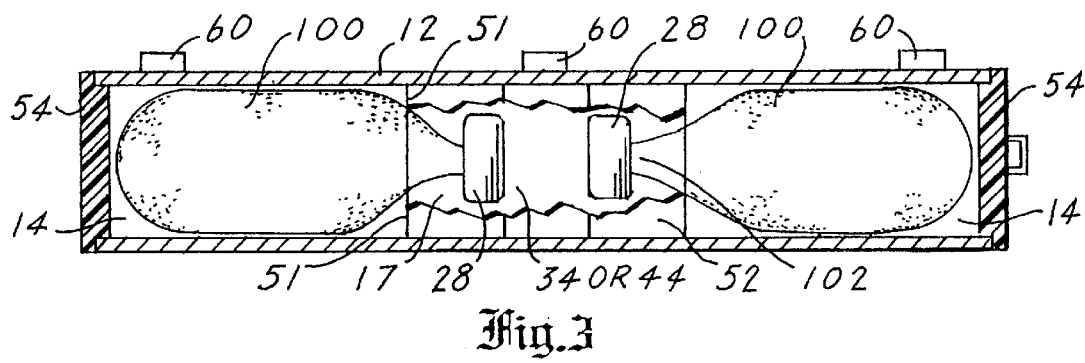
FIG. 3 is a side cross-sectional view of a parachute-containing structure having at least one parachute that is deployed from both ends of the structure.

The second design of the parachute-containing structure 12, as shown in FIG. 3, includes a parachute deployment end 14 on each end of the elongated tube. The second design is dimensioned to contain at least two parachutes 100 that are each deployed from their respective parachute deployment ends 14 by a substantially centered parachute deployment means 26.

Figure 4:
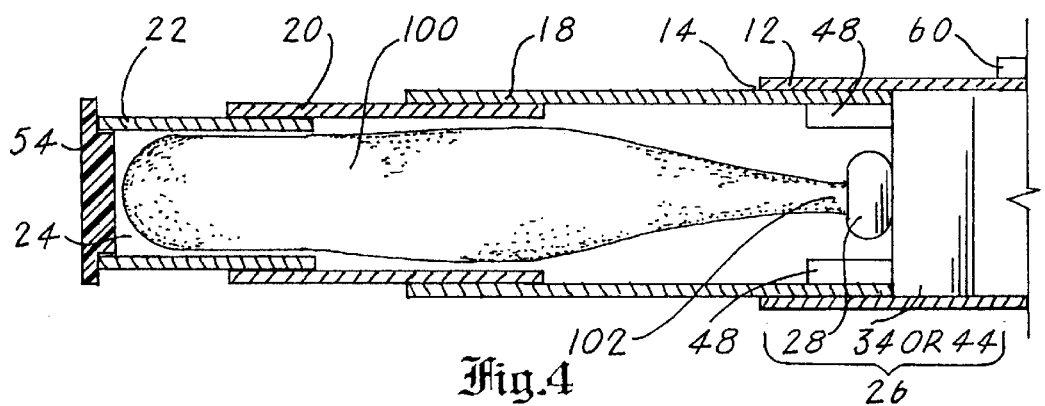
FIG. 4 is a partial side cross-sectional view of a parachute-containing structure that incorporates a telescoping section that extends outward from one end of the structure.

The third design of the parachute-containing structure 12 is shown in FIG. 4. In addition to including a parachute deployment end 14 and a rear end 16 (not shown), the third design incorporates at least one telescoping section and preferably first, second and third telescoping sections 18,20, 22 respectively. The sections are extended from the parachute deployment end 14 by a telescoping section extending means 48. When extended, the outward end of the third telescoping section 22 functions as an extended, parachute deployment end 24. The telescoping sections are dimensioned to contain at least one parachute 100 that is deployed from the extended parachute deployment end 24 by a parachute deployment means 26.

Figure 5:
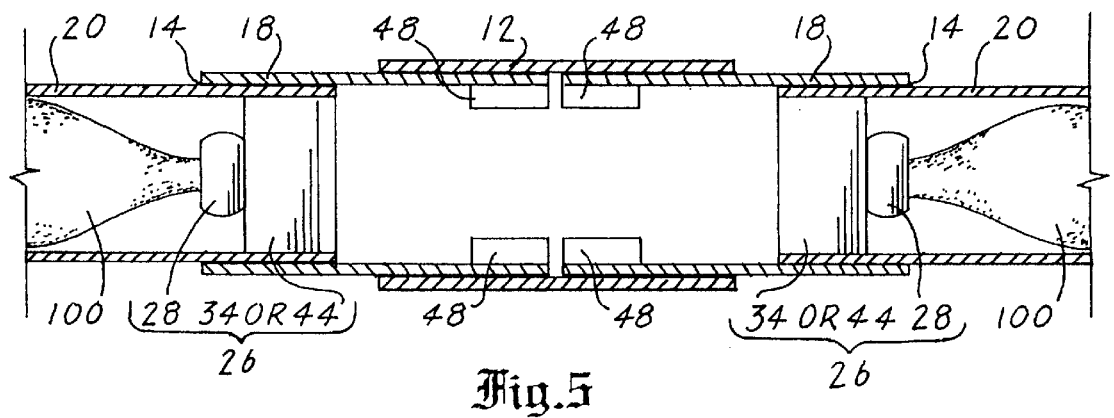
FIG. 5 is a partial side cross-sectional view of a parachute-containing structure that incorporates a telescoping section that extends outward from both ends of the structure.

The fourth design of the parachute-containing structure 12, as shown in FIG. 5, includes a parachute deployment end 14 on each end of the structure 12. From one of the ends 14 extends at least one telescoping section and, preferably, a first telescoping section 18 as shown in FIG. 5, and a second telescoping section 20. Likewise, from the other end 14 of the structure 12 also extends a first and second telescoping section 18,20. Each of the telescoping sections are extended by a telescoping section extending means 48, and the outward ends of the second telescoping sections 20 function as extended, parachute deployment ends 24 (not shown). Both of the telescoping sections 20 are dimensioned to contain at least one parachute 100 that is deployed from the respective deployment end 24 by a parachute deployment means 26.

The third and fourth designs because of their telescoping sections, allow the parachute deployment end 24 to be extended far beyond the helicopter's rear end 88, front end 90 and the circumferential arc produced by the helicopter rotor blades 96. The extension length is dependent upon the number of telescoping sections. These sections allow the parachute deployment end 24 to be extended to a distance that is substantially three times the length of the parachute-containing structure 12.

The parachute-containing structure 12 can also be designed to include a service cover 50, a service panel 52 and a dust cover 54. The service cover 50, as shown attached by an attachment means 51 in FIG. 2, is removed for scheduled preventive maintenance and/or repair. The service panel 52 is also attached by an attachment means 51 to the parachute-containing structure 12 that includes a side opening 17, as shown in FIG. 3. The service panel 52 is also removed for preventive maintenance and/or repair. As shown in FIGS. 2–4, the dust cover 54 is frictionally inserted into the parachute deployment end 14 or the extended parachute deployment end 24. The dust cover 54 is preferably removed prior to a helicopter takeoff. However, if the cover is inadvertently not removed, the force of the parachute being deployed is sufficient to detach the cover while the helicopter is in flight.

In all four designs, the parachute deployment means 26 is comprised of a parachute attachment device 28 having a first end 30 and a second end 32. The first end 30, as shown in FIGS. 2–5, is attached to the inward, strut end 102 of the parachute 100. The second end 32 of the parachute attachment device 28 is attached either to the first end 36 of a spring apparatus 34 or the first end 36 of an explosive device 44.

When a spring apparatus 34 is used, its first end 36 of the apparatus is attached to the second end 32 of the parachute attachment device 28. The second end 38 of the spring apparatus 34 is attached to an electromechanical device 40 such as an electromechanical relay. When the device 40 is enabled, the spring apparatus 34 is activated, which then releases the parachute 100.

When an explosive device 44 is used, its first end 36 is attached to the second end 32 of the parachute attachment device 28. The second end 38 of the explosive device 44 is attached to an explosive cap 46 that, when detonated, causes the explosive device 44 to be activated which then releases the parachute 100.

Figure 6:
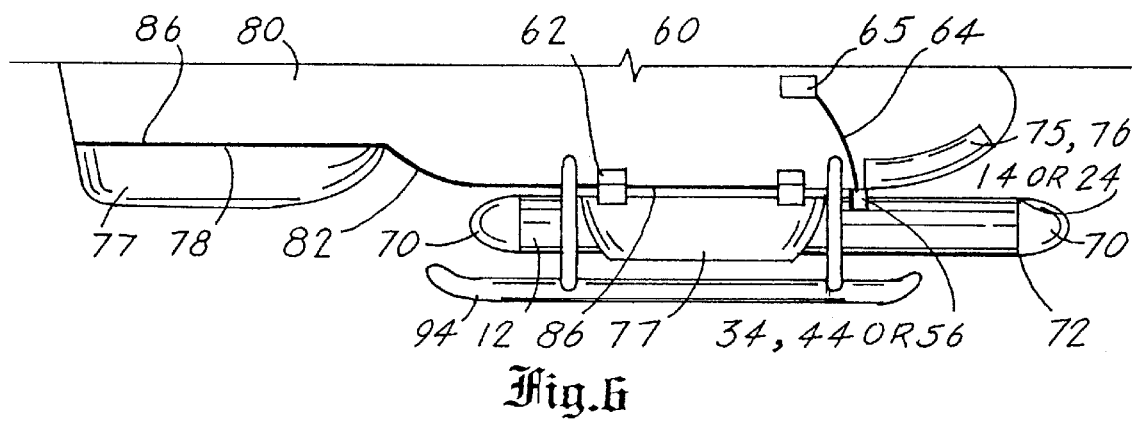
FIG. 6 is a partial side view of a helicopter having a parachute-containing structure attached to the lower surface of a helicopter. The structure has a parachute deployment end that extends outward from the helicopter's front end.

The electromechanical device 40 is enabled and the explosive cap 46 is detonated by means of a cable assembly 64 that includes a control unit 65, as shown in FIG. 6. The control unit 65 is accessible within the cabin of the helicopter 80 to allow the electromechanical device 40 or explosive cap 46 to be remotely enabled or detonated, respectfully, by a helicopter crew member when an out-of-control landing or other extreme emergency can not be avoided.

In lieu of a crew-initiated parachute deployment means 26, the deployment means can also consist of a dynamic responsive switch 56, as shown in FIG. 6. The switch 56 is placed in an armed condition by a helicopter crew member when an out-of-control landing cannot be avoided or an extreme emergency exists. The armed switch 56 is designed to activate either the spring apparatus 34 or the explosive device 44, via a cable assembly 65. The activation occurs when the disabled helicopter 80 attains a specified altitude, or the switch can be set to activate when the helicopter reaches an abnormal rate of descent or an excessive bank.

The telescoping section extending means 48, as shown in FIGS. 4 and 5, can either be comprised of a spring apparatus 34 or an explosive charge 44. The activation of the apparatus 34 or charge 44 is similar to that described supra.

Figure 7:
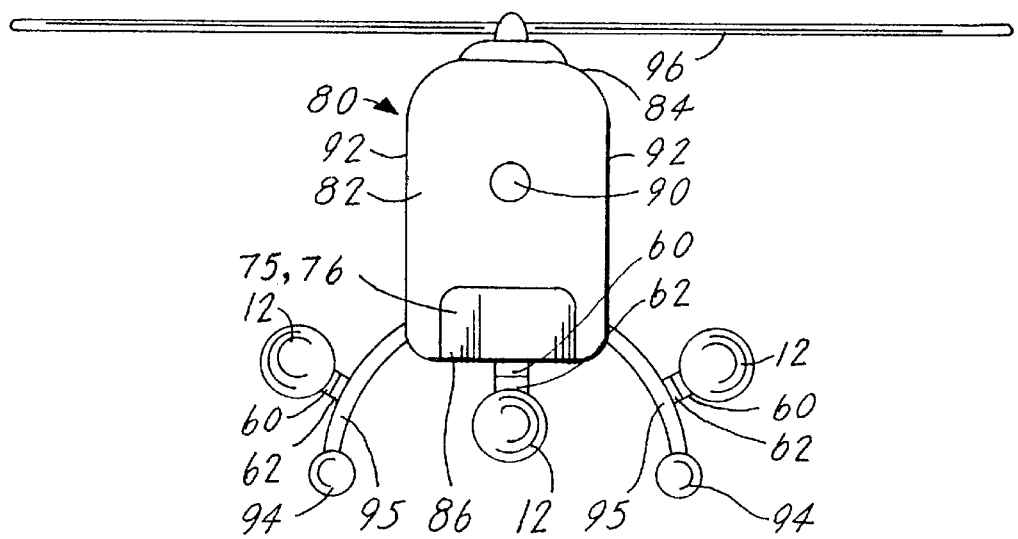
FIG. 7 is a front elevational view of a helicopter having a parachute-containing structure longitudinally and centrally attached between the landing gear and to each outward side of the landing gear struts.

The parachute-containing structure 12 utilized in all the design configurations includes at least two latching devices 60 that are attached to the structure 12, as shown in FIGS. 6 and 7. The latching devices 60 are designed to be latched to a corresponding latch receptor 62 located on the fuselage 82 or landing gear 94, of the helicopter 80, as also shown in FIGS. 6 and 7.

The parachute-containing structure 12, in either the single structure or the structure that utilizes a telescoping section, is designed to be attached to various locations on the helicopter 80.

As shown in FIGS. 6 and 7, the structure 12 extends longitudinally and is laterally centered and attached to the lower surface 86, of the fuselage 82 between the pair of landing gear 94. In this attachment location, the parachute deployment end 14,24 extends beyond the helicopter's front end 90 and the circumferential arc produced by the helicopter rotor blades 96.

Figure 8:
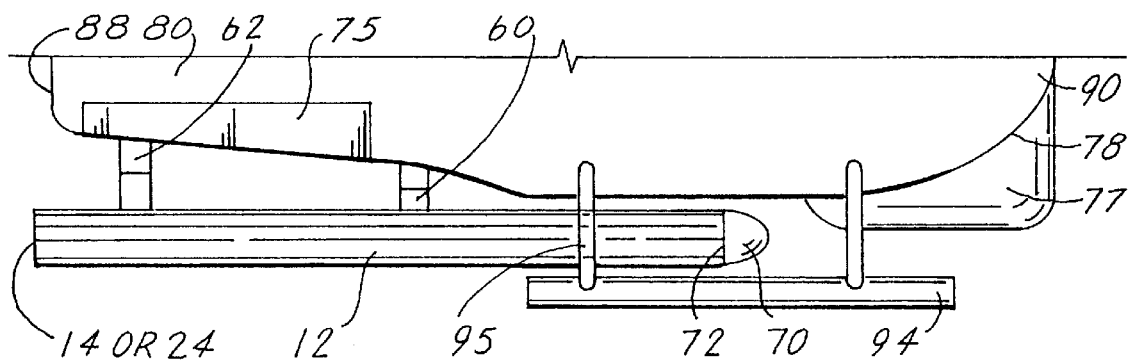
FIG. 8 is a partial side view of a helicopter having a parachute-containing structure attached to the lower surface of a helicopter. The structure has a parachute deployment end that extends outward from the helicopter's rear end.

In a second attachment location, as shown in FIG. 8, the parachute-containing structure 12 extends longitudinally and is laterally centered and attached to the lower surface 86 of the helicopter 80 between the landing gear 94. In this attachment scheme, the parachute deployment end 14 or 24, extends beyond the helicopter rear end 88 and the circumferential arc produced by the helicopter's rotor blades 96.

Figure 9:
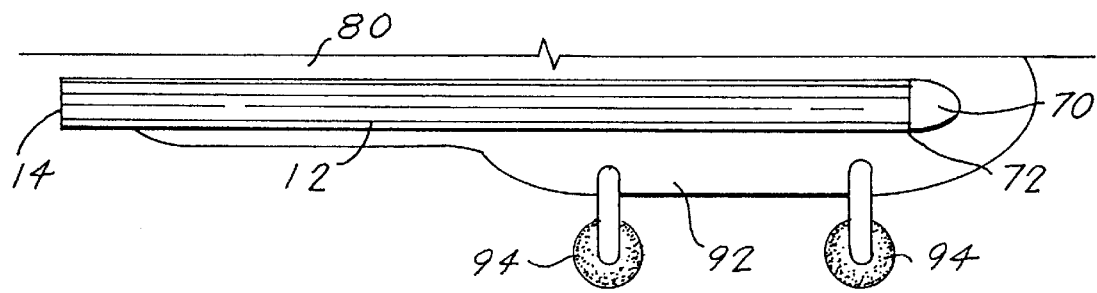
FIG. 9 is a partial side view of a helicopter having a parachute-containing structure attached to the helicopter sides.
Figure 10:
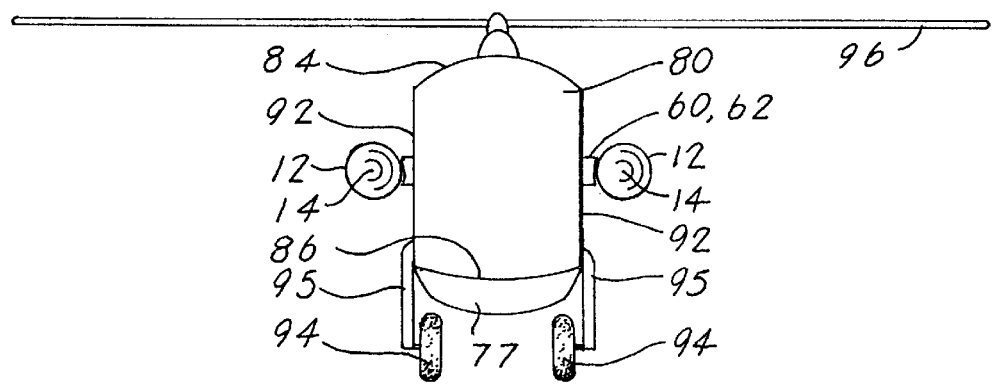
FIG. 10 is a front elevational view of a helicopter having a parachute-containing structure attached to the helicopter sides and an aerodynamic airbag enclosure attached to the helicopter's lower surface.

FIGS. 9 and 10 show a parachute-containing structure 12 that is longitudinally attached to each side 92 of the helicopter 80. The parachute deployment end 14 or 24 of each structure 12 can be located to extend beyond the rear end 88 or the front end 90 (not shown) and the circumferential arc produced by the helicopter's rotor blades 96. As shown in FIG. 7, the structure 12 can also be attached to the outer surface of each landing gear strut 95.

Figure 11:
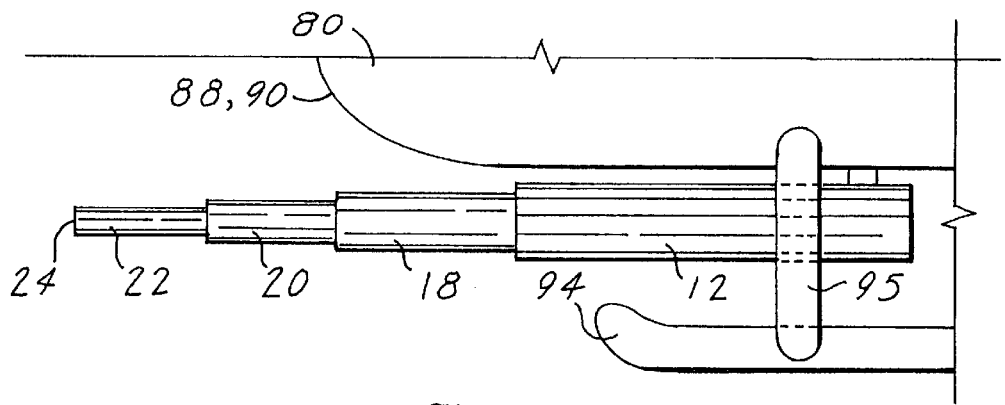
FIG. 11 is a partial side view of a helicopter having a parachute-containing structure attached to the helicopter's lower surface. The structure incorporates three telescopic sections that extend outward from either the front or rear end of the structure.
Figure 12:
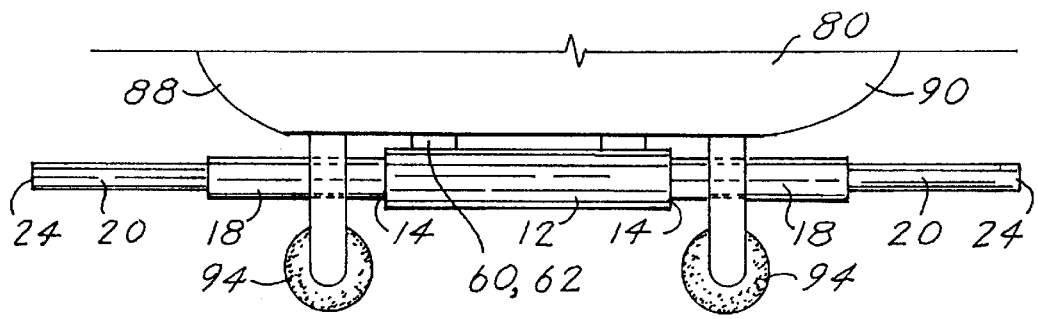
FIG. 12 is a partial side view of a helicopter having a parachute-containing structure attached to the lower surface of a helicopter. The structure incorporates two telescopic sections that extend outward from each end of the structure.

When a parachute-containing structure 12 that includes a telescoping section, as shown in FIG. 4, is utilized, the structure 12 can be located further inward. The telescoping sections 18, 20 or 22, when extended, allow the extended parachute deployment end 24 to extend far beyond the respective front or rear ends 90,88 of the helicopter and the arc of the helicopter's rotor blades 96, as shown in FIG. 11. When a parachute-containing structure 12, which includes a telescoping section that extends from both ends 14 of the structure 12, as shown in FIG. 5 is utilized, the structure 12 can have a smaller length and be centered on the lower surface 86 of the helicopter 80, as shown in FIG. 12, or centered on the landing gear struts 95 (not shown). In either case, the extended parachute deployment end 24 can be extended to a length that is substantially three times the length of the structure 12. This extended length reaches beyond the helicopter's rear end 88 and front end 90, as well as the circumferential arc produced by the helicopter's rotor blades 96.

Figure 13:
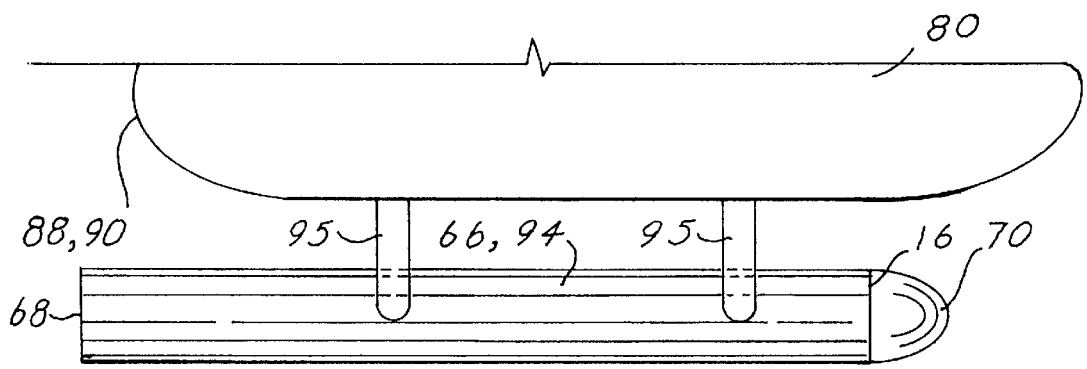
FIG. 13 is a partial side view of a helicopter having a parachute-containing structure that is comprised of a pair of hollow landing skids that also function as landing gear.

The final parachute-containing structure disclosed utilizes a pair of elongated hollow landing skids 66 that function as the helicopter's 80 landing gear 94. These skids, as shown in FIG. 13, have at least one parachute deployment end 68 that extends beyond the rear end 88 or front end 90 and the circumferential arc produced by the helicopter's rotor blades 96. The length of the landing skids 66 can be shortened if the structure 12 includes at least one telescoping section 18.

The parachute deployment end 14,26 of the parachute-containing structure 12 can be designed to include a streamlined fairing 70, as shown in FIGS. 6, 8 and 9, which reduces drag and head resistance of the helicopter 80 while in flight. The fairing 70 includes a means 72 for separating the fairing prior to the deployment of the parachute 100. The separation means can consist of an explosive charge or spring means that is activated when pressure is exerted on the inner contact surface of the fairing 70. Alternatively, the fairings can be friction fitted so that the force of the parachute being deployed is sufficient to detach the fairing.

Figure 14:
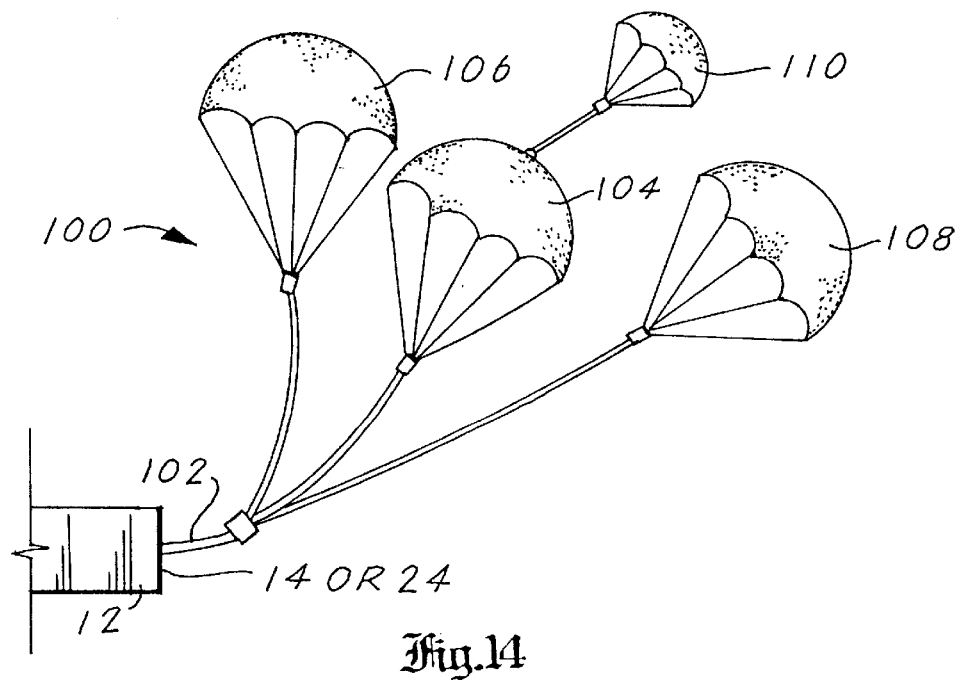
FIG. 14 is a partial view of a parachute-containing structure that has deployed a center parachute that is flanked by a left and right parachute. The center chute also shows a drogue chute that aids in the deployment of these parachutes.

The parachute 100 used in the emergency soft-landing system 10 is of the heavy-duty type that is designed to support a significant weight, such as the weight of a helicopter 80. The preferred number of parachutes 100 that are deployed from the structure 12 is one. However, a plurality of parachutes such as a center parachute 104 flanked by left and right parachutes 106,108, as shown in FIG. 14, can be employed. When three parachutes are used, the center parachute 104 includes a pilot or drogue parachute 110, as also shown in FIG. 14. The drogue parachute 110 aids in the deployment of the three parachutes 104,106,108.

To further insure a soft-landing, the helicopter soft-landing system is designed to include at least one inflatable airbag 74. The airbag 74 is shown deployed in FIG. 1 and is preferably contained within an enclosed cavity 75. This cavity is located on the helicopter's lower surface 86 adjacent the front end 90, as shown in FIGS. 6 and 7, or the lower surface 86 adjacent for rear end 88, as shown in FIG. 8. The airbag has means 76 for being deployed from the enclosed cavity 75 and subsequently inflated concurrent with the deployment of the parachute 100. The inflated airbag 74 is dimensioned to encompass the area surrounding the helicopter's lower surface 86 and the respective rear end 88 and front end 90, as shown in FIG. 1.

In lieu of a cavity 75, the airbag 74 can be designed to be contained within an enclosed aerodynamic enclosure 77, as shown in FIGS. 6 and 10, which reduces drag and head resistance. The enclosure 77 includes an upper surface 78 that is conformed to be longitudinally attached to the helicopter's lower surface 86. The enclosed aerodynamic structure 77 can also be attached to the helicopter's lower surface 86, between the landing gear 84, as shown in FIG. 10. This location is particularly suitable when a parachute-containing structure 12 is attached to the outer sides of the landing gear structure, as shown in FIG. 7. The structure 77 is preferably constructed of aluminum, however, a high-impact plastic can also be used.

Figure 15:
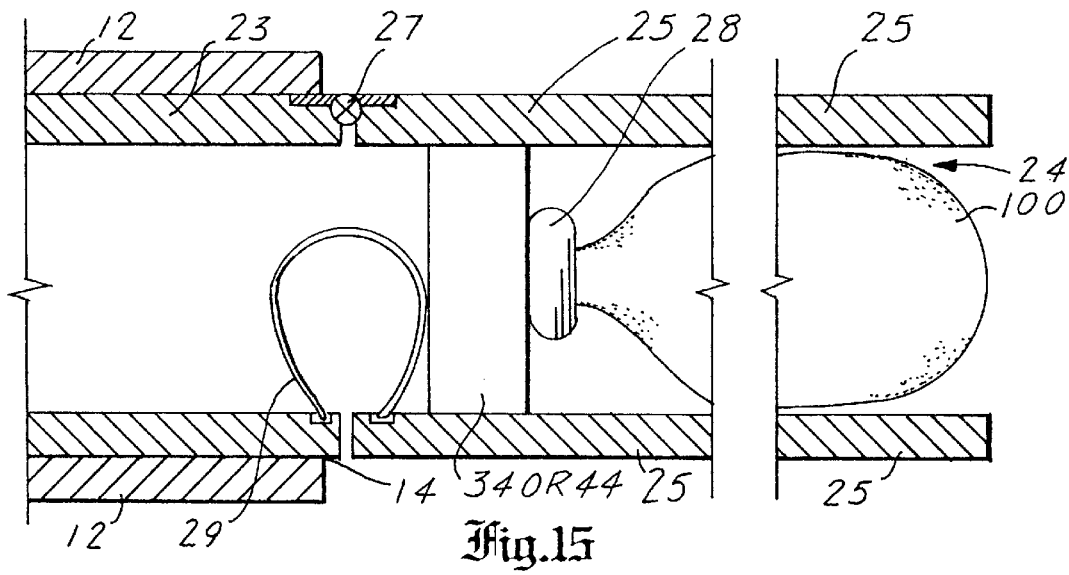
FIG. 15 is a partial side cross-sectional view of a parachute-containing structure that incorporates a telescoping section that includes an inner section and an outer section that rotates upward. The two sections are shown in their aligned non-rotated position.
Figure 16:
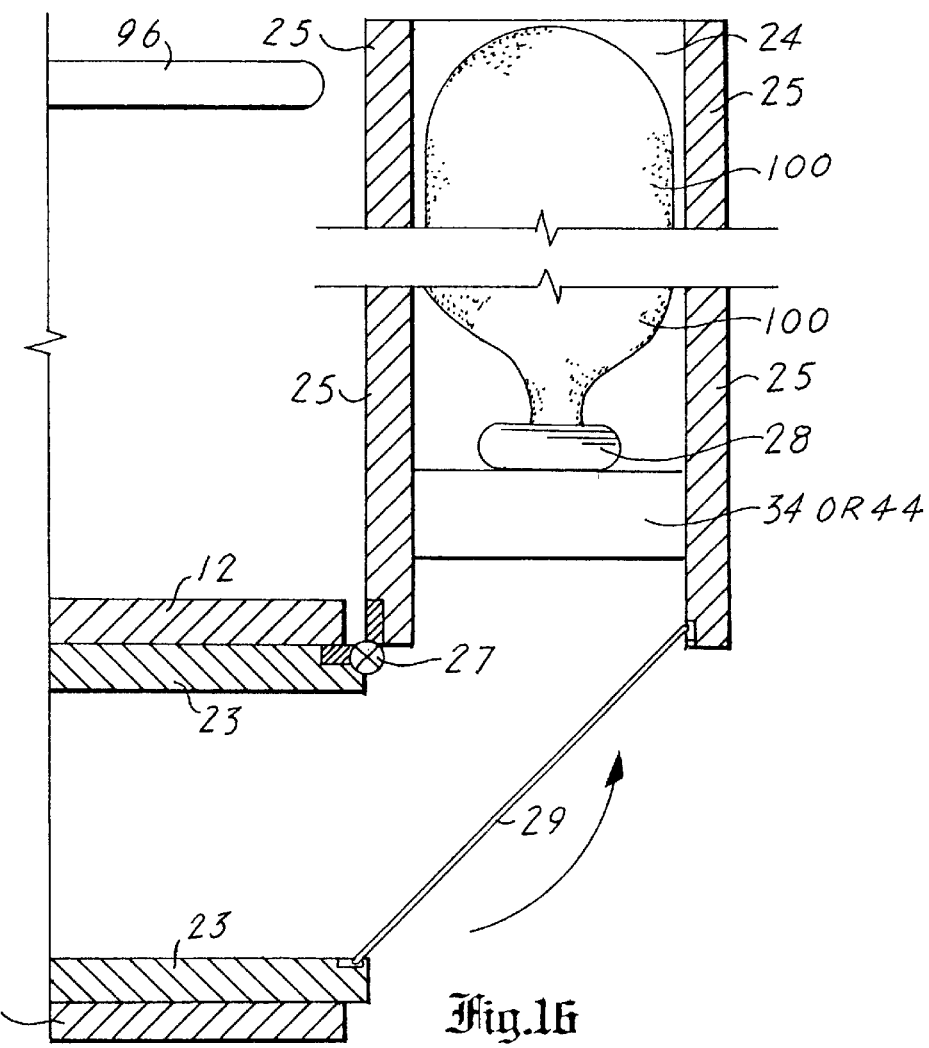
FIG. 16 is a partial side cross-sectional view of the parachute-containing structure as described in FIG. 15. The outer section is shown in its fully rotated position wherein the extended parachute deployment end is located above the horizontal plane of the helicopter rotor blades.

While the invention has been described in complete detail and pictorially shown in the accompanying drawings it is not to be limited to such details, since many changes and modifications may be made in the invention without departing from the spirit and scope thereof. For example, the telescopic section can be designed, as shown in FIGS. 15 and 16 to be comprised of an inner section 23 and an outer section 25. The outer section 25 includes a means for being rotatably attached to the inner section 23. The rotating means preferably consists of a hinge means 27 that is attached to the upper interfacing surfaces of the inner and outer sections 23,25. The rotating means also includes a stabilizing cable 29 attached to the opposite lower interfacing sections 23,25.

The inner and outer sections 23,25 are shown prior to being rotated in FIG. 15. In FIG. 16, the outer section 25 has been rotated so that the extended, parachute deployment end 24 is located above or near the horizontal plane of the helicopter rotor blades 96. The stabilizing cable 29 is dimensioned to maintain the outer section 25, when rotated, within the horizontal plane of the rotor blades 96. With this design, the deployed parachute 100 or its struts 102 cannot be entangled in the rotor blades 96. Hence, the invention is described to cover any and all modifications and forms which may come within the language and scope of the appended claims.

I claim:

1. An emergency soft-landing system for rotor-type aircraft said system comprising:

a) at least one parachute-containing structure having at least one parachute deployment end, which extends longitudinally, and is laterally centered and attached to the lower surface of the helicopter fuselage, between said pair of landing gear, wherein the parachute deployment end extends beyond the helicopter's front end and the circumferential arc produced by the helicopter's rotor blades, b) means for attaching said parachute-containing structure to a structural member of a rotor-type aircraft, that is comprised of a helicopter having a fuselage with an upper surface, a lower surface, a rear end, a front end, sides and a pair of landing gear that extend downward from each side of the fuselage's lower surface and, c) means for deploying at least one fast-deployment parachute from the parachute deployment end during an emergency landing situation.

2. An emergency soft-landing system for rotor-type aircraft said system comprising:

a) at least one parachute-containing structure having at least one parachute deployment end, which extends longitudinally, surface of the helicopter fuselage, between said pair of landing gear, wherein the parachute deployment end extends beyond the helicopter's front end and the circumferential arc produced by the helicopter's rotor blades, b) means for attaching said parachute-containing structure to a structural member of a rotor-type aircraft, that is comprised of a helicopter having a fuselage with an upper surface, a lower surface, a rear end, a front end, sides and a pair of landing gear that extend downward from each side of the fuselage's lower surface and, c) means for deploying at least one fast-deployment parachute from the parachute deployment end during an emergency landing situation.

3. An emergency soft-landing system for rotor-type aircraft said system comprising:

a) at least one parachute-containing structure having at least one parachute deployment end, wherein to each side of the helicopter fuselage is longitudinally attached a parachute-containing structure, wherein the parachute deployment end of each said structure extends beyond the rear end or front end and circumferential arc produced by the helicopter's rotor blades, b) means for attaching said parachute-containing structure to a structural member of a rotor-type aircraft, that is comprised of a helicopter having a fuselage with an upper surface, a lower surface, a rear end, a front end, sides and a pair of landing gear that extend downward from each side of the fuselage's lower surface and, c) means for deploying at least one fast-deployment parachute from the parachute deployment end during an emergency landing situation.

4. An emergency soft-landing system for rotor-type aircraft said system comprising:

a) at least one parachute-containing structure having at least one parachute deployment end, b) means for attaching said parachute-containing structure to a structural member of a rotor-type aircraft, that is comprised of a helicopter having a fuselage with an upper surface, a lower surface, a rear end, a front end, sides and a pair of landing gear that extend downward from each side of the fuselage's lower surface, wherein the landing gear having a pair of landing gear struts, wherein to the outer surface at each strut is detachably attached said parachute-containing structure, and, c) means for deploying at least one fast-deployment parachute from the parachute deployment end during an emergency landing situation.

5. An emergency soft-landing system for rotor-type aircraft said system comprising:

a) at least one parachute-containing structure having at least one parachute deployment end, b) means for attaching said parachute-containing structure to a structural member of a rotor-type aircraft, that is comprised of a helicopter having a fuselage with an upper surface, a lower surface, a rear end, a front end, sides and a pair of landing gear that extend downward from each side of the fuselage's lower surface, wherein the landing gear is comprised of a pair of reinforced elongated hollow skids having at least one parachute deployment end that extends beyond the circumferential arc produced by the helicopter's rotor blades, wherein each said skid also functions as a parachute-containing structure, and c) means for deploying at least one fast-deployment parachute from the parachute deployment end during an emergency landing situation.

* * * * *